(12) United States Patent
Liu

(10) Patent No.: US 6,935,301 B2
(45) Date of Patent: Aug. 30, 2005

(54) COMBUSTION CHAMBER

(75) Inventor: Zhengbai Liu, Naperville, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 50 days.

(21) Appl. No.: 10/725,091

(22) Filed: Dec. 1, 2003

(65) Prior Publication Data

US 2005/0115537 A1 Jun. 2, 2005

(51) Int. Cl.[7] .................................................. F02B 3/06
(52) U.S. Cl. ...................... 123/294; 123/193.6; 123/276
(58) Field of Search ............................ 123/193.6, 276, 123/279, 294, 298

(56) References Cited

U.S. PATENT DOCUMENTS

| 4,164,913 | A | | 8/1979 | Komiyama et al. | |
|---|---|---|---|---|---|
| 4,535,683 | A | | 8/1985 | Dworak et al. | |
| 4,721,080 | A | | 1/1988 | Moriyasu et al. | |
| 4,883,032 | A | | 11/1989 | Hunter et al. | |
| 5,029,563 | A | | 7/1991 | Hu | |
| 5,285,755 | A | | 2/1994 | Regueiro | |
| 5,560,334 | A | | 10/1996 | Daxer et al. | |
| 5,653,204 | A | | 8/1997 | Shaffer | |
| 5,746,169 | A | * | 5/1998 | Issler et al. | 123/193.6 |
| 5,809,962 | A | | 9/1998 | Abbott et al. | |
| 5,868,112 | A | | 2/1999 | Mahakul et al. | |
| 5,954,038 | A | | 9/1999 | Warwick et al. | |
| 6,112,715 | A | | 9/2000 | Nigro et al. | |
| 6,314,933 | B1 | * | 11/2001 | Iijima et al. | 123/193.6 |
| 6,513,476 | B1 | * | 2/2003 | Liu et al. | 123/193.6 |
| 6,536,404 | B2 | | 3/2003 | Liu et al. | |
| 6,601,561 | B1 | * | 8/2003 | Liu et al. | 123/276 |
| 6,637,402 | B2 | * | 10/2003 | Liu | 123/279 |
| 6,705,273 | B1 | * | 3/2004 | Liu et al. | 123/276 |
| 2003/0217732 | A1 | * | 11/2003 | Kataoka et al. | 123/276 |

* cited by examiner

Primary Examiner—Tony M. Argenbright
(74) Attorney, Agent, or Firm—Dennis Kelly Sullivan; Susan L. Lukasik; Jeffrey P. Calfa

(57) ABSTRACT

A combustion chamber assembly for use in a diesel engine, includes a combustion chamber having a lower portion and an upper portion and being defined in a crown of a piston, the combustion chamber lower portion being formed of a plurality of spherical and annular surfaces having smooth annular transitions; and the combustion chamber upper portion having at least one step defining a flat surface and defining a transition between the lower portion and the crown. A piston incorporating the combustion chamber assembly and a method for forming the combustion chamber assembly are further included.

57 Claims, 2 Drawing Sheets

FIG. 1, DETAIL A

COMBUSTION CHAMBER

TECHNICAL FIELD

The present invention relates to a piston designed for used in a compression ignition (diesel) internal combustion engine. More particularly, the present invention relates to a combustion chamber defined in the crown of a piston.

BACKGROUND OF THE INVENTION

Many attempts have been made to produce an ideal flow pattern for the charge of air and fuel within the combustion chamber of an internal combustion engine. Considerations that must be taken into effect include, but are not limited to, providing for adequate power generation minimizing the $NO_x$ entrained in the engine exhaust and minimizing the amount of soot particulate also entrained in the engine exhaust.

It is known that changes in any one of a variety of engine design/operating variables, such as engine compression ratio, combustion chamber shape, fuel injection spray pattern, and other variables can have an effect on both emissions and power generated.

The amount of soot that is expelled with the engine's exhaust is unsightly and generates public pressure to clean up diesel engines. Further, the amount of soot that is entrained in the engine's lubrication oil can have a deleterious effect on engine reliability. Soot is very abrasive and can cause high engine wear.

There is additionally a great deal of pressure to reduce the $NO_x$ emissions from the engine. Ever increasing regulatory demands mandate reduce levels of $NO_x$. Typically, a combustion chamber design that is effective at reducing $NO_x$ levels has been found to increase the levels of soot and vice-versa. Additionally, doing either of the aforementioned typically reduces engine torque and power outputs.

There are numerous examples of combustion chambers formed in the crown of piston. Notwithstanding all these prior art designs, there remains a need for reduction both in $NO_x$ and entrained soot while at the same time maintaining or enhancing engine torque and power outputs.

SUMMARY OF THE INVENTION

The piston of the present invention substantially meets the aforementioned needs of the industry. The combustion chamber of the present invention defined in the crown of the piston has been shown by substantiated simulation to both reduce soot entrainment and $NO_x$ emissions while at the same time maintaining engine power output. The piston has been shown to function effectively with cylinder heads having two or more valves. A further advantage of the piston of the present invention is that by being symmetrical with respect to a piston central axis, the combustion chamber is relatively easily formed in the crown of the piston. The piston and combustion chamber of the present invention are preferably used in heavy-duty and medium-duty diesel engines.

The present invention is a combustion chamber assembly for use in a diesel engine, and includes a combustion chamber having a lower portion and an upper portion and being defined in a crown of a piston, the combustion chamber lower portion being formed of a plurality of spherical and annular surfaces having smooth annular transitions; and the combustion chamber upper portion having at least one step defining a flat surface and defining a transition between the lower portion and the crown. The present invention is further a piston incorporating the aforementioned combustion chamber and a method of forming the combustion chamber.

BRIEF DESCRIPTION OF THE DRAWINGS

FIG. 1 Detail A is an enlarged sectional view of the structure within circle 1a of FIG. 1;

DETAILED DESCRIPTION OF THE DRAWINGS

Figure 1:
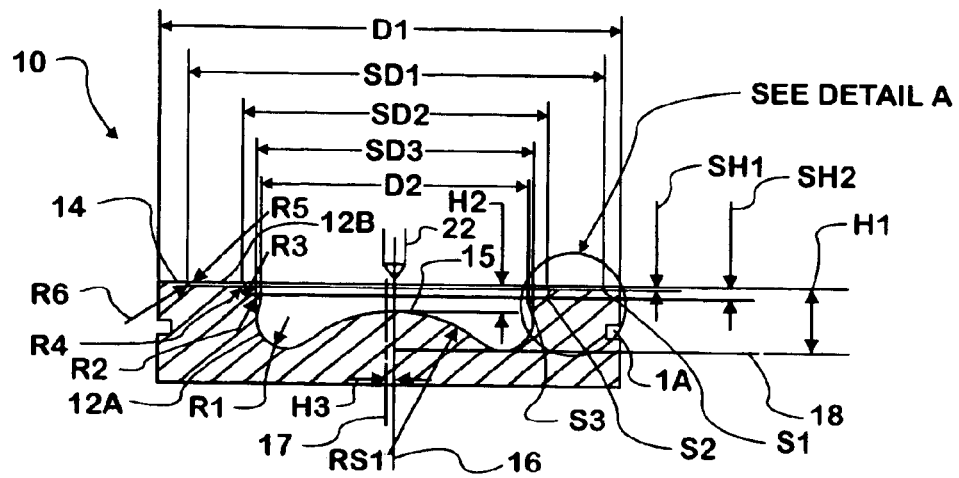
FIG. 1 is a sectional view of the piston and combustion chamber of the present invention.
Figure 1:
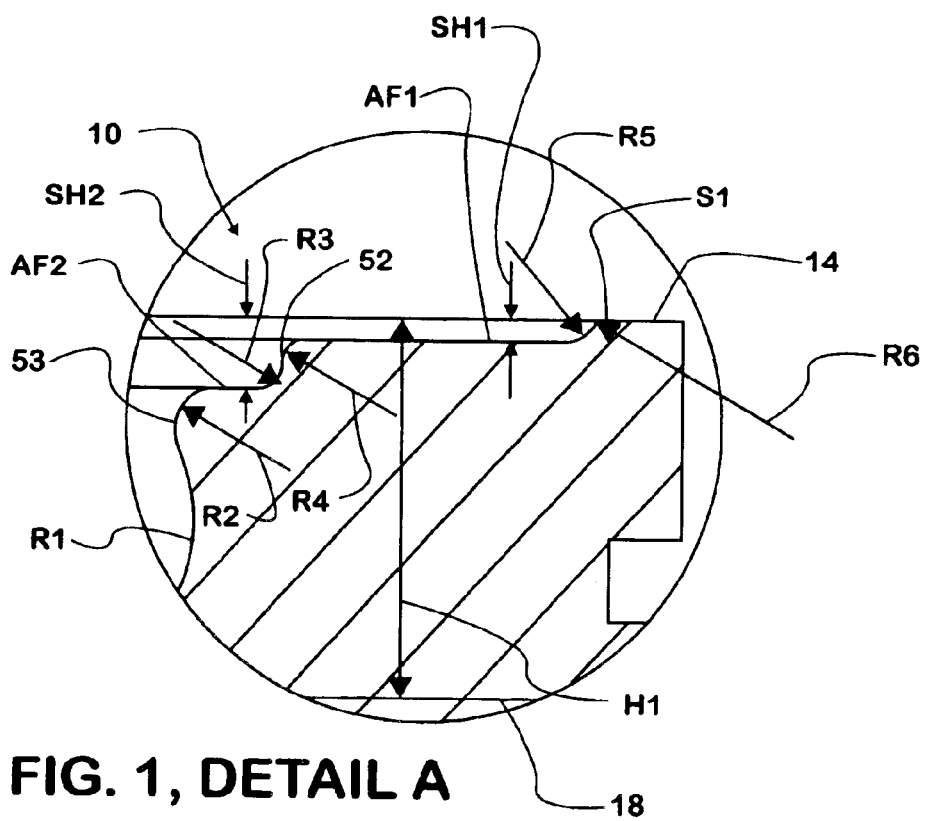

The piston of the present invention is shown generally at 10 in FIG. 1 and in more detail in FIG. 1, Detail A. Generally, the piston 10 has a centrally located symmetrical upward directed cavity for forming a portion of a combustion chamber 12 within a cylinder (not shown) of a diesel engine. The combustion chamber 12 is defined in the crown 14 of the piston 10. The engine has a fuel injector 22 for forming a fuel injection plume relative to the combustion chamber 12. The piston 10 may be utilized with two-valve multiple-valve heads. It is desirable that the fuel be injected proximate the center of the piston 10 and that the injection pattern be radially symmetrical relative to the longitudinal chamber axis 16. The piston 10 is effective at reducing diesel engine pollutant emission, such as $NO_x$ and soot, as depicted in the graphic representations of FIGS. 2 and 3. The piston 10 is preferably applicable to heavy-duty and medium duty diesel engines.

The crown 14 of the piston 10 defines in part the upper margin of the piston 10. The combustion chamber 12 of the present invention is defined in the crown 14. It should be noted that the combustion chamber 12 is symmetrical about the longitudinal chamber axis 16 and that the longitudinal axis 16 is preferably coincident with the center axis 17 of the piston 10 but may be displaced therefrom a distance H3. The various radii (RS), and diameters (D), and heights (H) that will be described below are clearly indicated in the depiction of FIG. 1. RS indicates a spherical radius and R indicates annular surface radii.

The combustion chamber 12 of the piston 10 is comprised of a lower portion 12A having a plurality curved surfaces, including a spherical surface and an upper portion 12B having curved surfaces defining at least one step and at least one flat surface. There is a smooth, generally tangential transition between the various surfaces that define the combustion chamber 12, as described in greater detail below.

Generally, the combustion chamber lower portion 12A is comprised of four groups of parameters, as depicted in FIG. 1, including:

(1) the diameter group;
(2) the sphere group;
(3) the height group; and
(4) the annulus group.

The diameter group is comprised of two diameter parameters, in which D1 is the piston 10 diameter and D2 is the diameter of the combustion chamber lower portion 12A. The sphere group includes a single spherical surface with radius of RS1. The height group is comprised of two height parameters in which H1 is the depth of the combustion chamber 12 measured between the crown 14 and a plane 18 tangential to the lowest points of the combustion chamber lower portion 12A, and H2 is the distance between the piston crown 14 and the top point 15 of the convex spherical surface RS1. H3 is the offset of the chamber axis 16 from the piston axis 17. The annulus group includes a single annular surface R1.

The convex spherical surface RS1 is located at the center of the bottom of the combustion chamber 12 and forms a center post having the top point 15. The spherical surface RS1 smoothly transitions to the annular surface R1. The annular surface R1 forms the bottom and side portions of the combustion chamber lower portion 12A. The annular surface R1 transitions to the combustion chamber upper portion 12B by means of the small annular surface R2.

The following relationship of parameters controls the geometry of the combustion chamber lower portion 12A and the resultant emissions in diesel engines employing the piston 10 and combustion chamber 12.

a. The ratio of D2:D1 is greater than 0.44 and is less than 0.74, and is preferably 0.603.

b. The ratio of RS1:D1 is greater than 0.15 and is less than 0.45, and is preferably 0.3.

c. The ratio of H1:D1 is greater than 0.18 and is less than 0.35, and is preferably 0.292.

d. The ratio of H2:D1 is greater than 0.13 and is less than 0.33, and is preferably 0.178.

e. The ratio of R1:D1 is greater than 0.025 and is less than 0.23, and is preferably 0.069.

The combustion chamber upper portion 12B is designed to reduce thermal stress on the piston 10 and to improve piston 10 reliability, as well as to assist in the reduction of diesel engine pollutant emissions, such as $NO_x$ and soot.

A. The combustion chamber 12 upper portion 12B mainly comprises at least one step and preferably three steps, which divide the bowl upper portion 12B into three parts. The first step, S1, accommodates a minor part of the fuel injection plume and reduces thermal stress at the bowl edge as compared to an unstepped combustion chamber. S1 is formed by smoothly joined annular surfaces R5 and R6. R6 transitions to crown 14. R5 transitions to annular flat surface AF1. S1 has a height above plane 18 of H1-SH1.

The second step, S2, having a height above plane 18 of H1-SH2, is mainly for reducing thermal stress of the bowl edge and further for holding a small part of the fuel spray plume. S2 is formed by smoothly joined annular surfaces R3 and R4. R4 transitions to AF1 and R3 transitions to annular flat surfaces AF2.

The third step, S3, transitions into the major part of the combustion chamber, lower portion 12A, and with AF2 holds the major part of fuel injection plume. Step S3 is formed by annular surface R2, which smoothly transitions to both AF2 and R1.

The portion of the chamber 12B between S1 and S2 and between S2 and S3 is a generally flat surface (AF1 and AF2, respectively) preferably orthogonally disposed relative to the chamber axis 16. AF1 is defined between diameters SD1 and SD2. AF2 is defined between diameters SD2 and SD3. Each of the steps S1, S2, and S3 is a relatively small annular surface.

B. The origin of the spherical surface RS1 is preferably located on the centerline 16 of the combustion chamber 12.

In FIG. 1, D1 is the piston diameter, D2 is the diameter of the lower bowl portion 12A, SD1 is the diameter of the first step S1, SD2 is the second step S2 bowl diameter, SD3 is the maximum diameter of the third step S3 bowl, H1 is the total depth of combustion chamber, SH2 is the total height of first and second steps, S1 and S2, and SH1 is the height of the first step, S1. H2 is the distance between the peak of the bowl post 15 and the crown 14 and H3 is the distance between the bowl axis 16 and the piston axis 17.

C. The central axis of the combustion chamber bowl 16 can coincide with the central axis 17 of the piston 10 or has an offset, which is the distance H3. The distance H3 between the central axis 16 of the combustion chamber 12 and the central axis 17 of the piston 10 is equal to or greater than zero and be less than 0.09 D1, and is preferably zero.

D. The following relationship of parameters controls the combustion chamber geometry, resulting in manipulating thermal stress of bowl edge, and the combustion performance and emissions in diesel engines, which is listed below:

1. The ratio of SD1/D1 should be greater than 0.86 and should be less than 0.98, and is preferably 0.931.

2. The ratio of SD2/D1 should be greater than 0.55 and should be less than 0.85, and is preferably 0.695.

3. The ratio of SD3/D1 should be greater than 0.45 and should be less than 0.75, and is preferably 0.617.

4. The ratio of D2/D1 should be greater than 0.44 and should be less than 0.74, and is preferably 0.603.

5. The ratio of H1/D1 should be greater than 0.18 and should be less than 0.35, and is preferably 0.292.

6. The ratio of SH2/D1 should be greater than 0.025 and should be less than 0.22, and is preferably 0.034.

7. The ratio of SH1/D1 should be greater than 0.012 and should be less than 0.11, and is preferably 0.017.

In general, the highest thermal stress appears at the edge of combustion chamber bowl. The thermal stress increases with height as the height approaches the crown 14. In the design, the bowl 12 is wider than the chamber of an unstepped chamber bowl, so that the bowl edge is farther away from the fuel spray tip 22. Especially, the first step S1 and the second step S2 edges are much farther away from the fuel spray tip 22 than in the practice with an unstepped chamber bowl. As a result, the thermal stress of the bowl edge is reduced greatly, and the piston reliability is improved drastically.

The curves and smooth transitions of the combustion chamber 12 as previously described promote smooth flow in the combustion chamber 12 and act to reduce the thermal loading in the combustion chamber 12. Further, the combustion chamber 12 is symmetrical about the axis 16. Accordingly, it is much easier to turn the combustion chamber 12 as compared to an asymmetrical combustion chamber defined in a piston.

Figure 2:
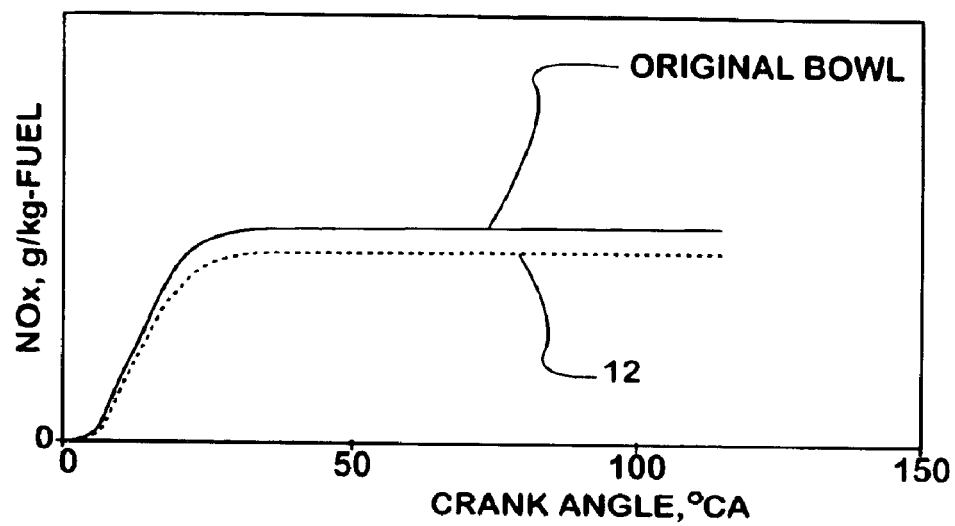
FIG. 2 is a graphic representation of an $NO_x$ generated relative to crank angle by the prior art (original bowl) piston and combustion chamber as compared to the piston and combustion chamber of the present invention, new bowl.
Figure 3:
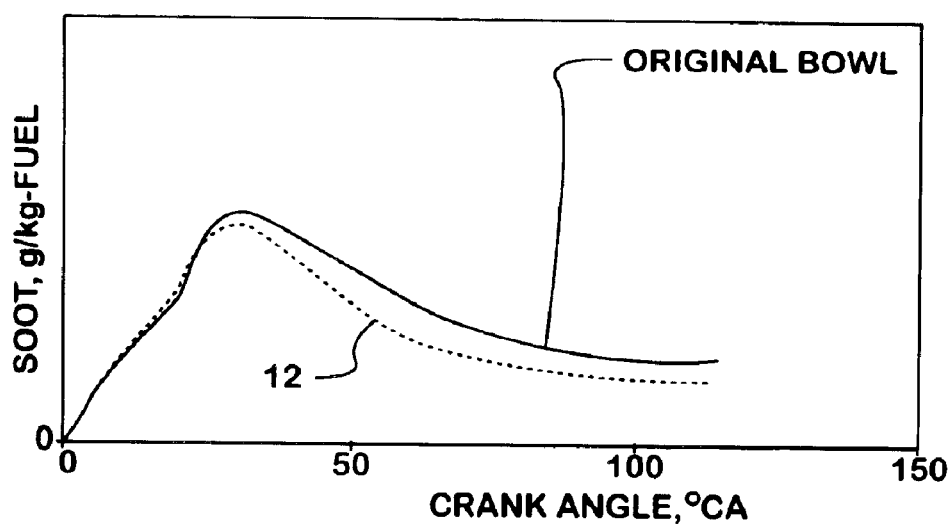
FIG. 3 is a graphic representation of the soot generated relative to crank angle by the prior art (original bowl) piston and combustion chamber as compared to the piston and combustion chamber of the present invention, new bowl.

FIG. 2 shows a comparison of $NO_x$ emissions between two types of combustion chambers. It is evident that $NO_x$ emissions in the new combustion chamber are reduced significantly, compared with the original combustion chamber. FIG. 3 presents a comparison of soot emissions between two types of combustion chambers. It is clear that soot emissions in the new combustion chamber are much lower than those in the original combustion chamber.

It will be obvious to those skilled in the art that other embodiments in addition to the ones described herein are indicated to be within the scope and breadth of the present application. Accordingly, the applicant intends to be limited only by the claims appended hereto.

What is claimed is:

1. A combustion chamber assembly for use in a diesel engine, comprising:
    a combustion chamber having a lower portion and an upper portion and being defined in a crown of a piston, the combustion chamber lower portion having a center portion, the center portion being defined at least in part by a portion of a convex sphere, the sphere having a radius and an origin, the origin of the radius lying on a piston central axis and the combustion chamber further having an outwardly radially disposed bottom margin, the bottom margin being defined in part by a portion of an annulus, the annulus being concave and having an origin and a radius;
    the combustion chamber upper portion having at least one step defining a flat surface disposed between the lower portion and the crown; and
    the combustion chamber having smooth annular transitions between adjacent surfaces, the surfaces including the spherical center portion and the annular bottom margin.

2. The combustion chamber assembly of claim 1, the combustion chamber upper portion having a second step defining a flat surface disposed between the lower portion and the crown adjacent to the first step.

3. The combustion chamber assembly of claim 2, the combustion chamber upper portion having a third step defining a transition from the chamber lower portion to the second step.

4. The combustion chamber assembly of claim 1, including a piston incorporating combustion chamber assembly.

5. The combustion chamber assembly of claim 2 wherein the flat surface is disposed substantially orthogonal with respect to a combustion chamber central axis.

6. The combustion chamber assembly of claim 3 wherein the flat surfaces are annular rings.

7. The combustion chamber assembly of claim 3 wherein the each of the steps effects as smooth transition between adjacent surfaces to the respective step.

8. The combustion chamber assembly of claim 3 wherein the each of the steps is an annular surface.

9. The combustion chamber assembly of claim 1 wherein the at least one step provides or reduced thermal stress in a piston incorporating the combustion chamber.

10. The combustion chamber assembly of claim 1 wherein the at least one step provides for reduced thermal stress by increasing a radial distance of a combustion chamber edge from a fuel injector tip.

11. The combustion chamber assembly of claim 1 wherein the ratio of $SD1/D1$ is greater than 0.86 and less than 0.98.

12. The combustion chamber assembly of claim 11 wherein the ratio of $SD1/D1$ is preferably 0.931.

13. The combustion chamber assembly of claim 1 wherein the ratio of $SD2/D1$ is greater than 0.55 and is less than 0.85.

14. The combustion chamber assembly of claim 13 wherein the ratio of $SD2/D1$ is preferably 0.695.

15. The combustion chamber assembly of claim 1 wherein the ratio of $SD3/D1$ is greater than 0.45 and is less than 0.75.

16. The combustion chamber assembly of claim 15 wherein the ratio of $SD3/D1$ is preferably 0.617.

17. The combustion chamber assembly of claim 1 wherein the ratio of $D2/D1$ is greater than 0.44 and is less than 0.74.

18. The combustion chamber assembly of claim 17 wherein the ratio of $D2/D1$ is preferably 0.603.

19. The combustion chamber assembly of claim 1 wherein the ratio of $H1/D1$ is greater than 0.18 and is less than 0.35.

20. The combustion chamber assembly of claim 19 wherein the ratio of $H1/D1$ is preferably 0.292.

21. The combustion chamber assembly of claim 1 wherein the ratio of $SH2/D1$ is greater than 0.025 and is less than 0.22.

22. The combustion chamber assembly of claim 21 wherein the ratio of $SH2/D1$ is preferably 0.034.

23. The combustion chamber assembly of claim 1 wherein the ratio of $SH1/D1$ is greater than 0.012 and less than 0.11.

24. The combustion chamber assembly of claim 23 wherein the ratio of $SH1/D1$ is preferably 0.017.

25. The combustion chamber assembly of claim 1 wherein the ratio of $H2/D1$ is greater than 0.13 and less than 0.33.

26. The combustion chamber assembly of claim 25 wherein the ratio of $H2/D1$ is preferably 0.178.

27. A piston having a combustion chamber assembly for use in a diesel engine, comprising:
    a combustion chamber having a lower portion and an upper portion and being defined in a crown of a piston, the combustion chamber lower portion being formed of a plurality of spherical and annular surfaces having smooth annular transitions; and
    the combustion chamber upper portion having at least one step defining a flat surface and defining a transition between the lower portion and the crown, the combustion chamber upper portion having a second step defining a flat surface disposed between the lower portion and the crown adjacent to the first step.

28. The piston of claim 27, the combustion chamber upper portion having a third step defining a transition from the chamber lower portion to the second step.

29. The piston of claim 27, including the piston incorporating the combustion chamber assembly.

30. The piston of claim 27 wherein the flat surface is disposed substantially orthogonal with respect to a combustion chamber axis.

31. The piston of claim 28 wherein the flat surfaces are annular rings.

32. The piston of claim 28 wherein the each of the steps effects a smooth transition between adjacent surfaces to the respective step.

33. The piston of claim 28 wherein the each of the steps is an annular surface.

34. The piston of claim 27 wherein the at least one step provides for reduced thermal stress in a piston incorporating the combustion chamber.

35. The piston of claim 27 wherein the at least one step provides for reduced thermal stress by increasing a radial distance of a combustion chamber edge from a fuel injector tip.

36. The piston of claim 27 wherein the ratio of $SD1/D1$ is greater than 0.86 and less than 0.98.

37. The piston of claim 36 wherein the ratio of $SD1/D1$ is preferably 0.931.

38. The piston of claim 27 wherein the ratio of $SD2/D1$ is greater than 0.55 and is less than 0.85.

39. The piston of claim 38 wherein the ratio of $SD2/D1$ is preferably 0.695.

40. The piston of claim 27 wherein the ratio of $SD3/D1$ is greater than 0.45 and is less than 0.75.

41. The piston of claim 40 wherein the ratio of $SD3/D1$ is preferably 0.617.

42. The piston of claim 27 wherein the ratio of $D2/D1$ is greater than 0.44 and is less than 0.74.

43. The piston of claim 42 wherein the ratio of $D2/D1$ is preferably 0.603.

44. The piston of claim 27 wherein the ratio of $H1/D1$ is greater than 0.18 and is less than 0.35.

45. The piston of claim 44 wherein the ratio of $H1/D1$ is preferably 0.292.

46. The piston of claim 27 wherein the ratio of SH2/D1 is greater than 0.025 and is less than 0.22.

47. The piston of claim 46 wherein the ratio of SH2/D1 is preferably 0.034.

48. The piston of claim 27 wherein the ratio of SH1/D1 is greater than 0.012 and is less than 0.11.

49. The piston of claim 48 wherein the ratio of SH1/D1 is preferably 0.017.

50. The piston of claim 27 wherein the ratio of H2/D1 is greater than 0.13 and is less than 0.33.

51. The piston of claim 50 wherein the ratio of H2/D1 is preferably 0.178.

52. A method of forming a combustion chamber for use in a diesel engine, comprising:
    defining a combustion chamber in a crown of a piston, the piston having a central axis, defining the combustion chamber by the steps of:
    defining a combustion chamber lower portion and an upper portion, forming the combustion chamber lower portion of a plurality of spherical and annular surfaces having smooth annular transitions;
    defining a transition between the lower portion and the crown by forming the combustion chamber upper portion with at least one step defining a flat surface; and
    forming a second step defining a flat surface disposed between the lower portion and the crown adjacent to the first step.

53. The method of claim 52, including forming a third step defining a transition from the chamber lower portion to the second step.

54. The method of claim 53, including disposing the flat surface substantially orthogonal with respect to a combustion chamber central axis.

55. The method of claim 53, including forming the flat surfaces as annular rings.

56. The method claim 53, including each of the steps effecting a smooth transition between adjacent surfaces to the respective step.

57. The method of claim 53, including forming the steps as an annular surface.

\* \* \* \* \*